United States Patent [19]
Baur

[11] Patent Number: 5,108,246
[45] Date of Patent: * Apr. 28, 1992

[54] AUTOMATED ARCHIVING AND RETRIEVAL SYSTEM FOR COMPUTER TAPE CASSETTES

[75] Inventor: Rolf Baur, Heubach-Lautern, Fed. Rep. of Germany

[73] Assignee: Grau GmbH & Co., Fed. Rep. of Germany

[*] Notice: The portion of the term of this patent subsequent to Mar. 20, 2007 has been disclaimed.

[21] Appl. No.: 306,182
[22] Filed: Feb. 6, 1989

Related U.S. Application Data

[63] Continuation-in-part of Ser. No. 182,593, Apr. 18, 1988, abandoned.

[30] Foreign Application Priority Data

Sep. 29, 1988 [DE] Fed. Rep. of Germany ....... 3832994

[51] Int. Cl.⁵ .............................................. B65G 65/00
[52] U.S. Cl. .................................... 414/223; 414/787; 901/7
[58] Field of Search ............... 414/331, 223, 280, 787; 901/6, 7, 8

[56] References Cited

U.S. PATENT DOCUMENTS

| 3,715,040 | 2/1973 | Polus et al. ...................... 414/280 X |
| 3,822,025 | 7/1974 | Loos .................................... 414/280 |
| 3,920,195 | 11/1975 | Sills et al. ........................ 414/273 X |
| 4,271,440 | 6/1981 | Jenkins et al. . |
| 4,664,590 | 5/1987 | MaeKawa .............................. 901/6 X |
| 4,678,390 | 7/1987 | Bonneton et al. ............... 414/331 X |
| 4,742,405 | 5/1988 | Teranishi .................................. 360/92 |
| 4,754,445 | 6/1988 | Young et al. . |

FOREIGN PATENT DOCUMENTS

| 0288165 | 10/1988 | European Pat. Off. . |
| 2047386 | 4/1971 | Fed. Rep. of Germany . |
| 3621790 | 1/1988 | Fed. Rep. of Germany . |
| 3730021 | 8/1989 | Fed. Rep. of Germany . |
| 2115764 | 6/1972 | France . |
| 2610755 | 8/1988 | France . |
| 60-61947 | 4/1985 | Japan . |
| 60-118506 | 6/1985 | Japan . |
| 62-16457 | 4/1987 | Japan . |
| 1172840 | 8/1985 | U.S.S.R. .............................. 414/313 |
| 1587056 | 3/1981 | United Kingdom . |

OTHER PUBLICATIONS

IBM Technical Disclosure Bulletin, vol. 16, No. 5, Oct. 1973, pp. 1584 to 1585.
IBM Technical Disclosure Bulletin, vol. 25, No. 10, Mar. 1983, pp. 5006 to 5007.
Patent Abstract of Japan, vol. 10, No. 387 JP-6-1-175967.
Grau GmbH & Co., layout drawings dated Nov. 27, 1987 and Dec. 16, 1987.
Grau/Lampertz brochure, CBIT Fair, Hanover, FRG, Mar. 16-23, 1988.

Primary Examiner—David A. Bucci
Assistant Examiner—Donald W. Underwood
Attorney, Agent, or Firm—Nixon & Vanderhye

[57] ABSTRACT

An automated archiving and retrieval system for computer tape cassettes includes at least one tape storage facility for storing a number of computer cassettes during periods of non-use, and at least one pair of tape drive sections. Each of the tape drive sections is positioned on a respective lateral side of the tape storage facility in spaced relationship therewith. A pair of robot transports is therefore capable of operating in a respective one of these defined spaces so as to transport tape cassettes between the tape storage facility and its respective tape drive sections.

4 Claims, 2 Drawing Sheets

AUTOMATED ARCHIVING AND RETRIEVAL SYSTEM FOR COMPUTER TAPE CASSETTES

RELATED APPLICATIONS

This application is a continuation-in-part of commonly owned, copending U.S. application Ser. No. 07/182,593 filed Apr. 18, 1988 in the name of Rolf Baur and entitled "Robot Transport System Adapted to Interact with Equipment at Spaced Locations" now abandoned, and is related to commonly owned U.S. application Ser. No. 07/306,181 filed even date herewith in the name of Rolf Baur and entitled "Storage Units for Computer Tape Cassettes".

FIELD OF INVENTION

This invention relates to the field of computer tape cassette archiving systems. More specifically, the present invention relates to an especially adapted automated computer tape cassette archiving and retrieval system which may be easily expandable so as to accommodate a user's need for increased data storage capacity. In a preferred form, the present invention is embodied in a centrally located tape storage facility and tape drive sections located on respective lateral sides thereof. Robot transports operate in spaces defined between the tape storage facility and a respective tape drive section so as to move tapes between the tape storage facility and a respective tape drive section.

BACKGROUND AND SUMMARY OF THE INVENTION

Today's large scale computer rooms typically employ human technicians which manually load magnetic data storage media (e.g. magnetic tapes) onto computer drives. With the recent advent of computer tape cassettes (i.e., as represented by the IBM 7575 system), the space requirement for physically cataloging and storing the magnetic media has decreased (due to the decreased size of these tape cassettes as compared to the more conventional magnetic tape spools).

However, human intervention is still typically required when a tape cassette must be removed from, or inserted into, a computer's tape drive. In my related copending application Ser. No. 07/182,593, there is disclosed a novel robot transport system having particular utility in the automated archiving and retrieval of computer data tape cassettes. In particular, the robot transport system disclosed in that application allows computer tape cassettes to be moved between a tape storage facility (where individual tape cassettes are archived) and a tape drive section (composed of individual tape drive units). It is preferred, according to the system according to that application, for the tape storage facility and tape drive section to be arranged serially along one side of the robot transport's path of conveyance.

While in some computer room applications, the preferred physical equipment layout in my copending application Ser.. No. 07/182,593 is entirely satisfactory, it would be desirable (in the interests of conserving computer room space) if a more compact arrangement and disposition of equipment were provided. At the same time it would especially be desirable if the storage capacity and/or tape drive capacity could be arranged so that each is easily expanded (e.g., by the addition of one or more tape storage and/or tape drive units) without significant disruptive effects upon the operation of the system. It is towards achieving such improvements that the present invention is directed.

An easily expandable automated computer tape cassette archiving and retrieval system is disclosed herein which includes a tape cassette storage facility and a pair of tape drive sections (each including at least one tape drive adapted to receiving preselected tape cassettes). The tape drive sections are disposed in spaced relation to the tape storage facility on respective opposite lateral sides thereof. A pair of robot transport assemblies (which may be of the track and carriage type disclosed in my copending U.S. application Ser. No. 07/182,593) are provided such that each operates in a respective one of the spaces defined between the tape storage facility and the laterally disposed tape drive sections.

The system of the present invention is therefore advantageous since a pair of robot transports can operate simultaneously to move tapes between the tape cassette storage facility and its associated tape drive section. The operation of multiple robot transports thereby makes it possible to increase the rate at which tape cassettes are transferred between the tape storage facility and the tape drive sections—i.e., since more than one robot transport is capable of operation without interfering with the other robot transport at any given time.

In addition, according to the present invention, a pair of opposing robot transports may be operatively associated with each of the respective tape drive sections—that is, by providing a primary and an auxiliary robot transport carriage on a single set of tracks associated with each of the tape drive sections. According to this aspect of the invention, the control system may be programmed so that the primary and auxiliary robot transports alternately move tape cassettes between the tape storage facility and their respective tape drive section without interference. Alternatively, the primary robot transport may be employed continually as the means to move tape cassettes between the tape storage facility and its respective tape drive section, with the auxiliary robot transport being maintained as an available standby in the event the primary robot transport malfunctions. In such a manner, the efficient operation of the computer system would not be comprised by down time associated with the primary robot transport.

The tape storage facility and/or the tape drive sections may be readily expanded simply by adding additional tape cassette storage units and/or tape drive units, respectively. This expansion may, moreover, be accomplished without significant disruption of the already existing tape cassette storage and drive units. At the same time, the longitudinal space required for such expansion is minimized, while the tape cassette storage and tape drive capacities for a given space are maximized. This, in turn, results in more efficient space utilization for the computer room in which the present invention is employed.

Other aspects and advantages of this invention will become more clear to the reader after careful consideration is given to the detailed description of the preferred exemplary embodiments thereof which follow.

BRIEF DESCRIPTION OF THE ACCOMPANYING DRAWINGS

Reference will hereinafter be made to the accompanying drawings wherein like reference numerals throughout the various FIGURES denote like structural elements, and wherein;

FIG. 1 is a plan view of a computer tape storage library and retrieval system according to the present invention; and FIG. 2 is a schematic perspective view of a representative tape storage carousel employed in the system of FIG. 1.

DETAILED DESCRIPTION OF THE PREFERRED EXEMPLARY EMBODIMENTS

Figure 1:
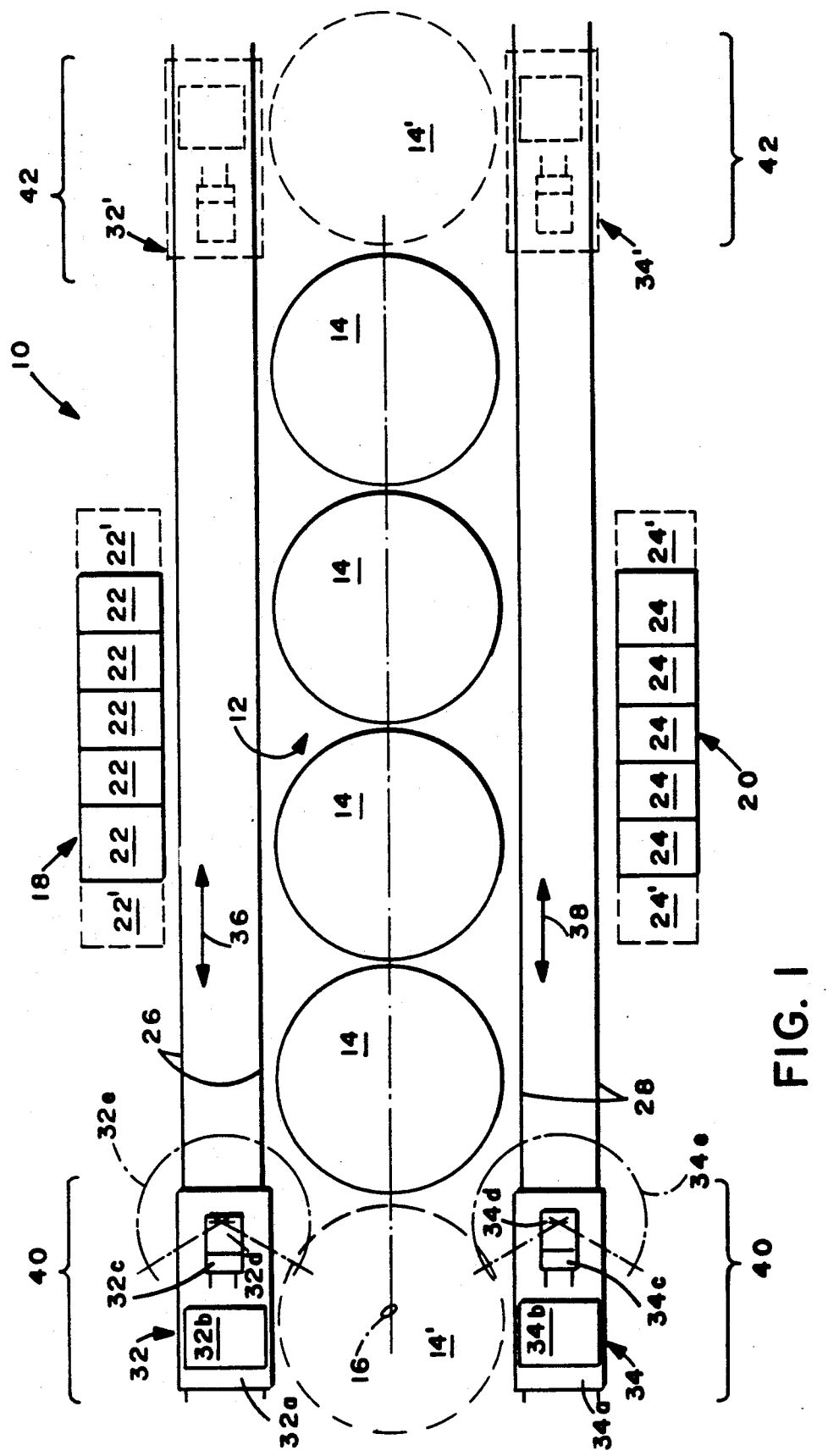

A particularly preferred computer tape cassette archiving and retrieval system 10 is shown in accompanying FIG. 1 in schematic plan view. As is seen, the system 10 generally includes a tape storage facility 12 comprised of individual tape storage carousels 14 aligned with one another in a row along a horizontal axis 16. Positioned on each lateral side of the tape storage facility (i.e., relative to the axis 16 along which the carousels 14 are aligned), there is provided a pair of tape drive sections 18, 20 each of which is preferably comprised of a number of individual tape drive units 22, 24, respectively. Each of the individual tape drive units 22 and 24 accepts an individual tape cassette (a representative few of which are identified in FIG. 2 by reference numeral 30) via a slot defined in its front panel facing the tape storage facility 12.

The tape drive sections 18 and 20 are each spaced from the tape storage facility 12 so as to allow for the positioning of track pairs 26, 28 therebetween, respectively. Robot transports 32, 34 are operatively associated with a respective track pair 26, 28 so as to be reciprocally movable therealong as indicated by arrows 36, 38. The robot transports 32, 34 are preferably of the type described in greater detail in my copending U.S. application Ser. No. 07/182,593.

In general, these robot transports 32, 34 include a carriage assembly 32a, 34a operatively coupled to a track pair 26, 28, respectively, for reciprocal movements therealong. Suitable drive means 32b, 34b (e.g., a reversible motor) is carried by each of the carriage assemblies 32a, 34b, respectively, so as to provide the necessary motive force.

A vertical column 32c, 34c is also carried by the carriage assemblies 32a, 34a and includes a vertically movable platform 32d, 34d upon which a robotic manipulator (not shown) is supported. Preferably, each of the robotic manipulators supported upon a respective one of the platforms 32d, 34d is of the type described in my commonly owned and copending U.S. application Ser. No. 07/182,702 filed on Apr. 18, 1988 and entitled "Robot Manipulator".

The robotic manipulators supported upon the platforms 32d, 34d will thus exhibit an operational zone 32e, 34e so as to move individual tape cassettes between the tape storage facility 12 and a respective one of the tape drive sections 18, 20. Thus, the robot transport 32 (and its associated robotic manipulator) is capable of moving tape cassettes between individual ones of the tape storage carousels 14 and individual ones of the tape drive units 22. On the other hand, robot transport 34 is capable of moving tape cassettes between individual ones of the tape storage carousels 14 and individual ones of the tape drive units 24. The precise sequencing of the tape cassette retrieval to/from the tape storage facility 12 and the respective tape drive sections 18 and 20 is determined by programming a master control system, not shown.

In addition to the robot transports 32, 34, each of the track pairs 26, 28 may also be operatively provided with auxiliary robot transports 32', 34' in opposing relationship to (primary) robot transports 32, 34, respectively, as shown in phantom line in FIG. 1. The robot transports 32', 34' are preferably configured identically to robot transports 32, 34 and may thus be operated on the respective track pair 26, 28 simultaneously therewith (under suitable automated control supervision to prevent interference therebetween). Alternately, the auxiliary robot transports 32', 34' may simply be provided as an available stand-by in the event that the primary robot transports 32, 34, respectively, are taken out of service due to routing maintenance, equipment malfunctions, etcetera.

In this regard, it will be observed in FIG. 1 that the track pairs extend beyond the ends of the row of tape storage carousels 14 (i.e., in a direction parallel to axis 16) so as establish terminal end zones 40, 42 thereof. Each of the auxiliary robot transports 32', 34' may thus be "parked" in the zone 42 of its respective track pair 26, 28 and thus present no obstacle to the normal operation of primary robot transports 32, 34. Similarly, each of the primary robot transports 32, 34 may be "parked" in the zone 40 of its respective track pair 26, 28 and thereby provide no obstacle to the operation of its associated auxiliary robot transport 32', 34'.

Since the tape drive sections 18 and 20 are laterally positioned in parallel relative to the row of tape storage carousels 14, the system 10 of the present invention is easily expandable so as to accommodate a user's need for more tape cassette archiving and/or tape drive capacity. That is, if more system capacity is needed, additional tape drive units 22', 24' may be added to one, or both ends of the existing row of tape drive units 22, 24, respectively. Similarly, additional tape storage carousels 14' may be added to one, or both, ends of the row of existing carousels 14. Moreover, this storage carousels 14' may be accomplished without significant effects on the normal operation of the existing components—i.e., since the existing components do not need to be physically relocated. If additional tape storage carousels 14' are included in the system 10, then it is preferred that the end zones 40, 42 be re-established by additional lengths of track 26, 28.

Figure 2:
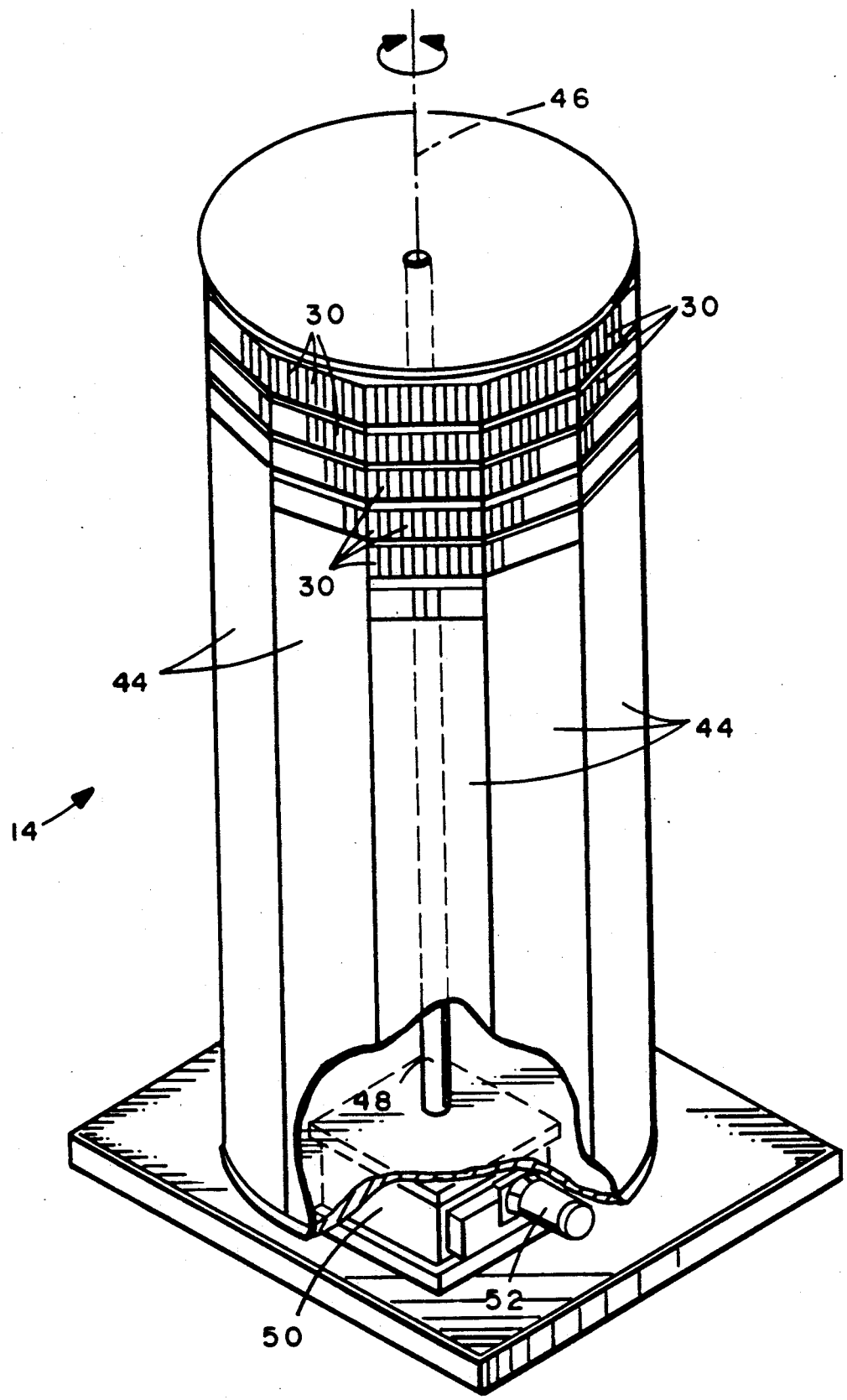

A representative tape storage carousel 14 is shown in schematic perspective elevation in accompanying FIG. 2. The carousel 14 generally includes a number of vertically disposed shelf units 44 each of which is positioned a predetermined radial dimension from a central vertical axis 46 established by support shaft 48. The shelf units 44 thereby support a number of individual tape cassettes 30, a representative few of which are shown in FIG. 2. The shaft 48 is itself journally mounted to pedestal 50 for clockwise and counterclockwise rotation about axis 46. Pedestal 50 houses suitable gears (or like power transmission structure) and thereby operatively couples the output of reversible motor 52 to the shaft 48 so as to rotatably drive the same.

Although rotatable tape storage carousels have been described above, it will be understood that they represent a particularly preferred embodiment of the tape storage facility 12 which may be employed in the system 10 of this invention. Thus, the present invention may, if desired, be provided with stationary (immovable) shelf units adapted to store a number of computer tape cassettes during periods of non-use without departing from the scope of the present invention. In this regard, the reader's attention is directed to my copending application Ser. No. 07/306,181 filed even date herewith for further information regarding the preferred rotatable tape carousel employed in the present invention, as well as preferred alternatives thereto.

In use, a computer room operator will select a particular tape cassette to be inserted into a particular one of the tape drive units 22, 24 (i.e., by inputting the identity of the tape cassette and the particular tape drive unit 22, 24 into a suitable master control system). The master control system will have the physical location of the tape cassette stored in memory (e.g., in an electronic "look-up" table) and will thus issue an output signal to rotate the appropriate one of carousels 14 which stores the selected tape cassette. The carousel will be rotated so that the selected tape cassette is in opposing relationship to the robot transport 32, 34 associated with the particular tape drive unit 22, 24 in which the tape cassette will be inserted. The robot transport 32 or 34 will then be moved along tracks 26 or 28, respectively, until the robot manipulator carried thereby is in operative range of the tape cassette. The robot manipulator may then grasp the tape cassette, remove it from its carousel 14, and then transport it to the designated tape drive.

As will now be appreciated the present invention provides for improvements in the archiving and retrieval of computer tape cassettes. However, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for storing computer tape cassettes and for transporting said cassettes between a storage location and a tape drive, said system comprising:
   at least one tape storage facility for storing a number of said computer tape cassettes during periods of non-use;
   first and second tape drive sections each having at least one tape drive for accepting a preselected one of said tape cassettes therein, said first tape drive section being positioned on one lateral side of said tape storage facility so as to define a first space therebetween, and said second tape drive section being positioned on another lateral side of said tape storage facility opposite to said one lateral side so as to define a second space therebetween;
   first and second robot transport means respectively movable along first and second substantially horizontal paths disposed within said first and second defined spaces between said storage facility and said first and second tape drive sections, whereby selected ones of said computer tape cassettes may be retrieved form said storage facility and inserted into said tape drive of said first and second tape drive sections, and wherein
   said storage facility includes a number of tape storage carousels, each said storage carousel including means for mounting said carousels for rotational movements about a substantially vertical axis, and wherein
   said number of tape storage carousels are aligned along a horizontal axis substantially parallel to said first and second paths of said first and second robot transport means, respectively.

2. A system as in claim 1, wherein each of said first and second robot transport means includes:
   pairs of parallel track members which define said first and second paths;
   first and second carriage means coupled to a respective pair of said track members for reciprocal movements along said defined path between forwardmost and rearwardmost positions relative to said storage facility; and
   motive means for moving said first and second carriage means along said respective pair of track members.

3. An automated computer tape cassette archiving system comprising:
   a tape cassette storage facility adapted to store a plurality of individual tape cassettes during periods of non-use;
   first and second tape drive units each disposed in relation to said tape cassette storage facility on a respective lateral side thereof so as to establish first and second spaces therebetween;
   first and second pairs of track means each extending essentially parallel to one another within said established first and second spaces to provide first and second conveyance paths, respectively; and
   first and second pairs of robot transport means operatively associated with said first and second pairs of track means and movable along said first and second conveyance paths within said established first and second spaces, respectively; wherein
   said tape storage facility includes a number of tape storage carousels, each including means for mounting said carousels for rotational movements about a substantially vertical axis, and wherein
   said number of tape storage carousels are aligned along a horizontal axis substantially parallel to said first and second paris of track means.

4. A fully automated system for archiving and retrieving data storage cassettes comprising:
   a storage facility having cassette compartments for data storage cassettes, said storage facility having at least two revolving units which are movable independently of one another and which contain said cassette compartments, all said cassette compartments being movable into both a first robot access position and a second robot access position by moving the respective revolving units, said first robot access position and said second robot access position being arranged essentially on opposite sides of said revolving storage facility;
   first and second tracks arranged substantially parallel to one another alongside said cassette storage facility;
   first and second robots respectively movable along said first and second tracks; and
   at least first and second cassette drive units located alongside said first and second tracks and exclusively associated with said first and second robots, respectively;
   (i) said first and second robots for transporting said data storage cassettes between said storage facility and a respective one of said first and second cassette drive units exclusively associated therewith;
   (ii) said first robot being movable between said first robot access position and said respective first cassette drive unit along said first track;
   (iii) said second robot being movable between said second robot access position and said respective second cassette drive unit along said second track; and wherein
   (iv) each one of said first and second robots have a zone of activity which does not overlap the zone of activity of the other of said first and second robots.

* * * * *